July 26, 1949.  R. H. NOYES  2,476,997
PULSE MODULATING SYSTEM
Filed Oct. 13, 1943
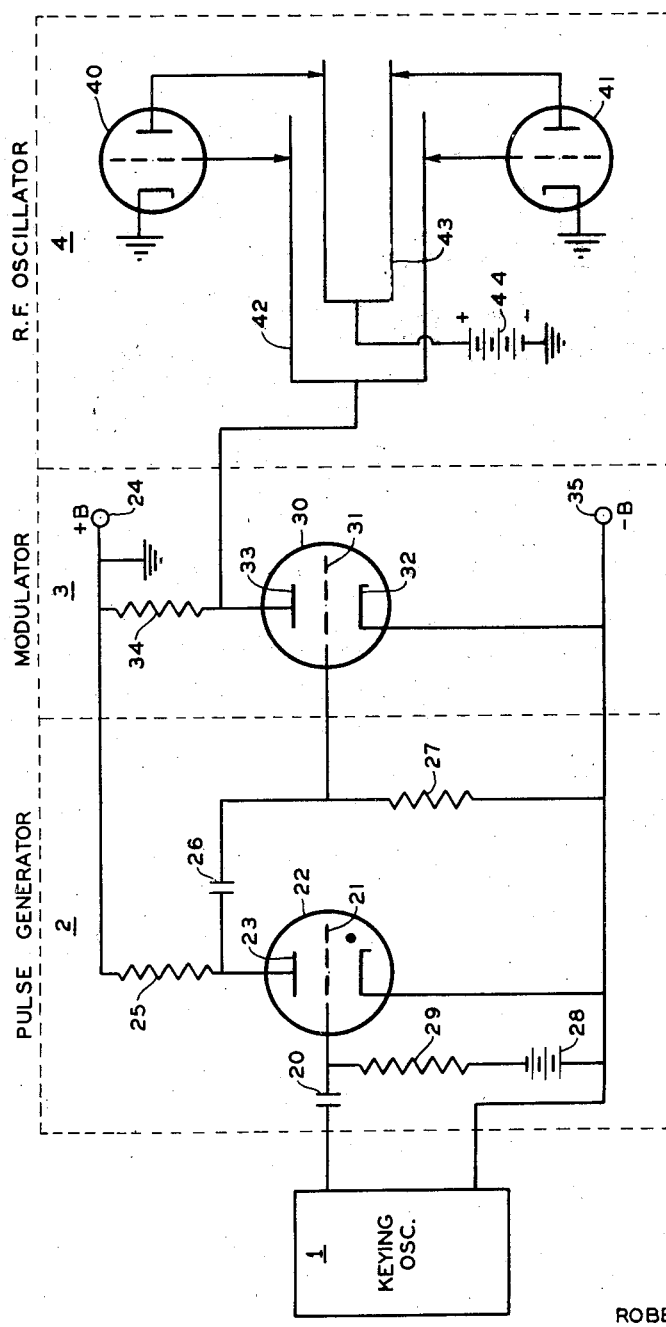
INVENTOR.
ROBERT H. NOYES.
BY William T. Hall.
Attorney Patented July 26, 1949

2,476,997

UNITED STATES PATENT OFFICE 2,476,997

PULSE MODULATING SYSTEM

Robert H. Noyes, Fair Haven, N. J.

Application October 13, 1943, Serial No. 506,033

3 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to pulse modulated radio transmitters, particularly such as are used in pulse-echo object detection systems, wherein a sharp pulse of radio energy is transmitted toward an object and the reflection therefrom detected by a receiver. Measurement of the time interval between the transmitted pulse and the received reflected pulse provides an indication of the distance from the object. Similar techniques are used for altitude determination.

It is important in such systems that the transmitted pulse be very sharp in order that no possible confusion occur between the transmitted pulse and a reflected pulse from an object a short distance away. Very sharp pulses also permit use of large peak powers of high frequency energy and at the same time keep the average power at a relatively low level.

It is an object of this invention to devise an improved system for generating sharp pulses of radio frequency energy. A further object of this invention is to provide a novel and simple circuit for changing a sine wave into periodic pulses of high voltage.

Prior to this invention radio pulse transmission was accomplished by using a transmitting oscillator, the tubes of which have their grids normally biased to plate current cutoff. This cutoff bias was removed by means of positive pulses impressed on said grids from a pulse generator. Prior designs of such pulse generators required complicated circuits for generating pulses of the required high voltage and short duration.

In accordance with my invention, use is made of a relatively simple pulse generator circuit incorporating a gas tube of the arc-discharge type, one example of which is generally known by the trade name "Thyratron." This tube is made to intermittently charge and discharge, preferably under the control of a stable keying oscillator, a pulse forming network. Because of the relatively small amounts of energy required to control powerful discharges in such tubes, the necessary power and voltage, required for modulating a pulse-echo transmitter, can be developed with a minimum of circuit complications.

For a better understanding of the invention, together with other and further objects thereof, reference is had to the following description taken in connection with the single figure in the accompanying drawing, which shows a schematic circuit diagram of my invention, and its scope will be pointed out in the appended claims.

Referring to the drawing, a sine wave keying oscillator 1, of relatively low frequency generally in the audio region, is connected to a pulse generator 2 of the arc-discharge tube type, which, at every cycle of sine-wave voltage applied thereto, generates a sharp pulse of potential, the duration of said pulse being relatively a minute fraction of the period of said sine wave. Said pulse is applied to the grid circuit of modulator 3, which in turn unblocks the normally blocked grid circuit of an ultra-high frequency oscillator 4, permitting the latter to oscillate for the duration of the pulse. The output of the oscillator may be radiated toward an object to be located through a directional antenna, not shown.

The sine wave output of keying oscillator 1 is applied, through a low impedance blocking condenser 20, to the grid 21 of a gas tube 22 of the arc-discharge type. The anode 23 of said tube is connected to the grounded positive terminal 24 of a plate potential source through a 150,000 to 300,000 ohm resistor 25, and the cathode of said tube is connected to the negative pole 35 of said source. The anode is also connected to said cathode through a 100 to 350 mmf. condenser 26 and a 2,000 to 4,000 ohm resistor 27 in series. Tube 22 is normally kept non-conducting by means of a negative bias from source 28 impressed on grid 21 through a 20,000 to 50,000 ohm resistor 29.

The modulator circuit comprises a tube 30, the grid 31 and cathode 32 of which are connected across resistor 27. The anode 33 is connected to the positive pole 24 of the plate supply source through a 15,000 to 20,000 ohm resistance 34, and cathode 32 is directly connected to the negative pole 35 of said source.

The oscillator 4 is of the conventional push-pull type including tubes 40 and 41, grid tuning lecher line 42, plate tuning lecher line 43, and plate power source 44, connected between the electrical center of the plate trombone 43 and ground. If desirable, tuning means not shown, may also be inserted between the cathodes of the oscillator tubes and ground. The electrical center of the grid line 42 is connected to the junction of plate 33 and resistor 34 so that the voltage drop across resistor 34 biases the grids of oscillator tubes 40 and 41 negatively with respect to their grounded cathodes. The plate line 43 may be coupled to an external circuit, such as an antenna, not shown.

The above described circuits operate as follows: Since gas tube 22 is normally non-conducting, there is no current through resistor 27 and the voltage on grid 31 of modulator tube 30 is normally zero. A high current therefore flows through resistor 34 in the plate circuit, resulting in a high negative voltage being impressed as a cutoff bias on the grids of oscillator tubes 40 and 41, so that the latter dc not oscillate.

While gas tube 22 is not conducting, condenser 26 is charged, through resistors 25 and 27, from the B-voltage source across terminals 24 and 35. On each positive swing of the ouput of keying oscillator 1, the negative bias on the grid 21 of gas tube 22 is sufficiently reduced to suddenly render it conducting. Preferably, said negative bias should be of such value that the gas tube becomes conducting substantially at the peak of the positive portion of the cycle from keyer 1. As a result, condenser 26 suddenly discharges through the anode-cathode path of tube 22 and resistor 27.

The duration of said discharge depends upon the time constant of the R-C network 26 and 27 (the resistance of the gas tube while conducting being negligible). By properly proportioning said R-C network this discharge can be made very rapid so that the duration of the resultant pulse across resistor 27 is a relatively minute fraction of the intervals between pulses. The discharge of condenser 26 lowers the plate potential of tube 22 below the minimum required to maintain the tube conducting. The grid of tube 22 thus regains control before condenser 26 can recharge sufficiently through resistor 25, due to the relatively long time constant of this circuit. The tube is therefore kept non-conducting until condenser 26 is fully recharged. On the next positive swing of the voltage from keyer 1, the gas tube is again rendered conducting and the above-described cycle of operation is repeated. Thus sharp spaced pulses of high peak voltage are developed across resistor 27 at a rate determined by the keying frequency.

The pulses appearing across resistor 27 intermittently bias the grid of modulator tube 30 to cutoff and cause intermittent decreases in the voltage drop across resistor 34. As a result, the cutoff bias on oscillator tube 41 is intermittently removed and the oscillator is rendered operative for the duration of each pulse. During the operating periods, the oscillator generates short trains of radio waves which are then radiated toward an object to be located.

Although specific values have been assigned to some of the components, it is to be understood that this has been done for purposes of example only. These values depend on well known design factors, e. g. pulse width, pulse repetition rate, peak voltages developed, tube characteristics, etc. While there has been described one embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. A system for transmitting intermittent trains of high frequency waves comprising a radio frequency generator of sustained oscillations having at least one electron tube, a blocking potential on the grid of said tube, whereby said generator is normally inoperative, a pulse generator comprising a normally non-conductive grid-controlled gas tube of the arc-discharge type, a condenser-resistor network in circuit with the space current path of said gas tube, audio frequency means connected to the grid circuit of said gas tube for intermittently rendering said gas tube conductive and rapidly charge and discharge said condenser, and means responsive to said discharge to decrease said blocking potential sufficiently to render said electron tube operative.

2. A system for transmitting intermittent trains of high frequency waves comprising a radio frequency generator of sustained oscillations having at least one electron tube, means for maintaining said tube inoperative comprising a normally conducting modulator tube and a resistor in the plate circuit thereof, the voltage developed across said resistor being applied as a blocking potential on the grid of said transmitter tube, means, including a pulse generator, to intermittently reduce the voltage across said resistor sufficiently to render said oscillator intermittently operative, said pulse generator comprising a normally non-conductive grid-controlled gas tube of the arc-discharge type, a pulse-forming network including a condenser-resistor network in circuit with the space current path of said gas tube, audio frequency means connected to the grid circuit of said gas tube for intermittently rendering said gas tube conductive to rapidly charge and discharge said condenser, and means to impress the output of said network upon the control grid of said modulator tube, the time constant of said network being a minor fraction of the period of said audio frequency means.

3. A pulse generator system comprising a normally blocked gas tube of the arc-discharge type having at least two electrodes, a condenser and two resistors, each resistor having one terminal respectively connected on opposite sides of said condenser, the resistance of one of said resistors being a minor fraction of that of the other, the other terminal of the smaller resistor being connected to one electrode of said tube and one pole of a source of potential, the other terminal of the larger resistor being connected to the other pole of said source of potential, the other electrode of said tube being connected to the junction of said larger resistor and condenser, and an output circuit connected across said smaller resistor, and periodic means for unblocking said tube, the time constant of the circuit including said tube, said condenser, and said resistor being a minor fraction of the period of said periodic means.

ROBERT H. NOYES.

REFERENCES CITED

The following references are of record in the file of this patent:

UNITED STATES PATENTS

| Number | Name | Date |
| --- | --- | --- |
| 1,695,042 | Fearing | Dec. 11, 1928 |
| 2,137,351 | Schlessinger | Nov. 22, 1938 |
| 2,188,611 | Norton | Jan. 30, 1940 |
| 2,225,046 | Hunter | Dec. 17, 1940 |
| 2,266,401 | Reeves | Dec. 16, 1941 |
| 2,407,272 | Hart | Sept. 10, 1946 |

FOREIGN PATENTS

| Number | Country | Date |
| --- | --- | --- |
| 108,640 | Australia | Sept. 22, 1939 |
| 113,233 | Australia | June 2, 1941 |